United States Patent [19]

Symens et al.

[11] 3,962,051
[45] June 8, 1976

[54] ATMOSPHERIC LEACHING OF MATTE CONTAINING IRON

[75] Inventors: Raymond D. Symens, Arvada; Paul B. Queneau, Golden; Antonio E. Blandon, Arvada, all of Colo.

[73] Assignee: Amax Inc., New York, N.Y.

[22] Filed: Dec. 26, 1974

[21] Appl. No.: 536,383

[52] U.S. Cl. ................................ 204/108; 423/34; 423/48; 423/140; 423/150; 75/74; 75/117
[51] Int. Cl.² ........................................... C25C 1/12
[58] Field of Search ............... 423/27, 48, 140, 150, 423/34; 75/74, 101 R, 117, 119; 204/108

[56] References Cited
UNITED STATES PATENTS

| | | | |
|---|---|---|---|
| 1,756,092 | 4/1930 | Lathe | 423/150 |
| 3,577,231 | 5/1971 | Pesses | 423/48 |
| 3,616,331 | 10/1971 | O'Neill | 423/150 |
| 3,741,752 | 6/1973 | Evans et al. | 423/150 X |
| 3,773,494 | 11/1973 | Tuwiner | 75/74 |

OTHER PUBLICATIONS

Toivanen et al. "Nickel Refining in Finland", C.I.M. Bulletin, June, 1964, pp. 653–658.
Llanos "Atmospheric Leaching of Matte at the Port Nickel Refinery", C.I.M. Bulletin, Feb., 1974, pp. 74–81.

*Primary Examiner*—Oscar R. Vertiz
*Assistant Examiner*—Brian E. Hearn
*Attorney, Agent, or Firm*—Kasper T. Serijan; Eugene J. Kalil

[57] ABSTRACT

A method is provided for leaching comminuted nickeliferous sulfide matte containing by weight about 20% to 75% nickel, about 5% to 50% copper, non-stoichiometric sulfur in the range of over 4% to about 20%, over 0.5% to about 15 or 20% iron, the sum of the nickel, copper and sulfur contents being at least about 80% of the matte composition, with the balance gangue or slag and incidental impurities.

The matte, because of the iron content, is first granulated by quenching molten matte from a temperature at least about 10°C above its solidus-liquidus temperature but below its boiling point, following which the matte is comminuted and subjected to atmospheric leaching to dissolve nickel selectively therefrom using a spent copper electrolyte solution containing sulfuric acid having a pH ranging up to about 2 while aerating said solution to cause the pH to rise to above 5 and effect substantial precipitation of copper and iron. Preferably, a two-stage atmospheric leaching is employed, the first stage in which the solution is aerated until the solution reaches a pH level of about 3.5 to 4.5 and a second stage atmospheric leaching step in which the aeration is replaced with a stronger oxidant, such as oxygen, in order to speed up the atmospheric leaching of the matte and to complete further said atmospheric leaching until the aqueous copper and iron are each reduced to less than 20 ppm as evidenced by a rise in pH to over about 5.

10 Claims, 5 Drawing Figures

ATMOSPHERIC LEACHING OF MATTE CONTAINING IRON

This invention relates to a method of leaching iron-containing nickeliferous sulfide matte and to a method for the atmospheric leaching of nickel-copper sulfide matte as a first step in the recovery of metal values therefrom in a multi-step process.

STATE OF THE ART

The patent literature is replete with proposals for the selective leaching of nickel from nickeliferous sulfide mattes, such as nickel sulfide and nickel-copper sulfide mattes.

In U.S. Pat. No. 967,072 (Aug. 9, 1910) for example, a process is proposed for leaching high grate matte containing little or no iron in which the nickel is selectively leached with dilute sulfuric acid while keeping the materials hot and agitated to hasten the reaction. The nickel sulfate solution formed is separted, dried and heated to red heat to convert it to nickel oxide which may then be reduced to metallic nickel in the usual manner. The patent also states that when the matte contains iron, it has been found useful under certain conditions to finely grind the matte while wet with one portion of diluted sulfuric acid to dissolve out a portion of the nickel and iron, the residue being thereafter further ground with another portion of diluted sulfuric acid to dissolve out the rest of the nickel and any iron that might be left.

A method is disclosed in U.S. Pat. No. 1,756,092 (Apr. 29, 1930) for selectively extracting nickel from nickel-copper sulfide matte. In order to increase the solution rate of nickel into the acid, the matte is melted and then rapidly cooled by granulation in water. The leaching is carried out in sulfuric acid under atmospheric pressure and a temperature of about 80°C to 100°C (176°F to 212°F).

U.S. Pat. Nos. 2,223,239 (Nov. 16, 1940), No. 2,239,626, (Apr. 22, 1941) and No. 2,753,259 (July 3, 1956) disclose the selective leaching of nickel from nickel-copper matte with acid, such as HCl or $H_2SO_4$. The patents point up the importance of employing matte in which the sulfur content is stoichiometrically less than the amount required to combine with all the metal values present. The less the amount of combined sulfur, the higher is the nickel recovery following leaching.

A discussion of atmospheric leaching is given in a technical paper entitled "Atmospheric Leaching of Matte at the Port Nickel Refinery" published by The Canadian Mining and Metallurgical Bulletin (Febuary, 1974).

A problem in the atmospheric leaching of nickeliferous matte is that the leaching characteristics of matte tend to vary from composition to composition, whether in the as-cast state or in the conventionally produced granulated state, particularly with respect to the iron content. Such characteristics are generally reflected in prolonged leaching times which adversely affect the economics of the process.

Conventional atmospheric leaching requires the iron content to be low, e.g. less than 0.5% by weight.

We have found that we can treat matte containing by weight over 0.5% iron and ranging up to about 15 or 20% and overcome the adverse effects of the presence of iron by employing a novel combination of operational steps which compensates for the presence of high iron. We have further found that when the presence of high iron tends to prolong the atmospheric leaching time and to depress the completion of the leaching reaction, we can shorten the leaching time and complete substantially the leaching reaction by employing a preferred embodiment of our invention.

OBJECTS OF THE INVENTION

It is thus the object of the invention to provide a method for the atmospheric leaching of nickeliferous sulfide matte containing relatively high iron to extract selectively and economically a substantial portion of the contained nickel.

Another object of the invention is to provide a leaching process for the selective extraction of nickel from nickeliferous matte wherein the presence of iron in either the matte and/or the leach solution and its adverse effects on the leaching process can be compensated for in a preferred embodiment by employing a novel combination of manipulative steps to effect the removal of iron from the leaching circuit.

These and other objects will more clearly appear when taken in conjunction with the following disclosure and the accompanying drawings, wherein.

STATEMENT OF THE INVENTION

Figure 1:
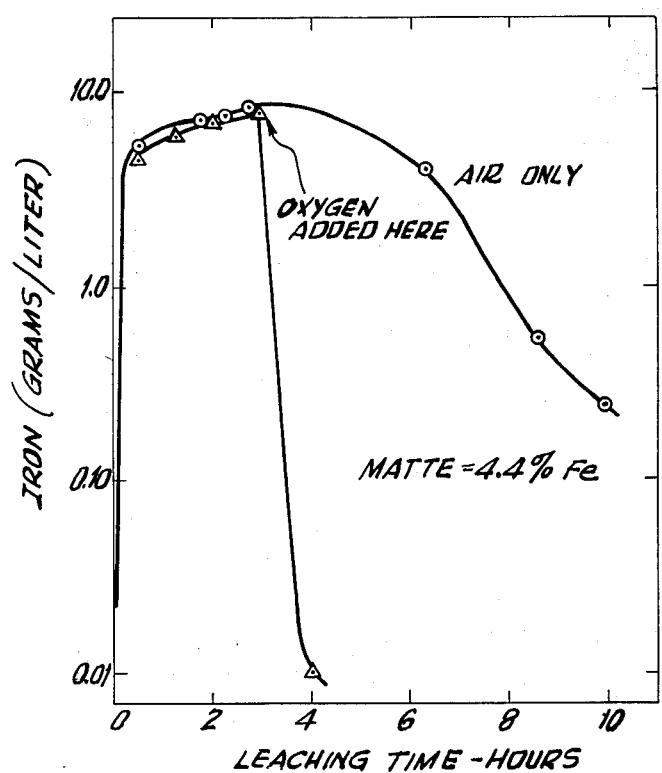
FIGS. 1 and 2 are curves showing the aqueous iron concentration and copper concentration, respectively, as a function of atmospheric leaching time and oxygen input.

Stating it broadly, a method is provided for leaching comminuted nickeliferous sulfide matte, such as nickel-copper sulfide matte containing non-stoichiometric amounts of sulfur. The method of the invention is preferably directed to mattes containing by weight about 20% to 75% nickel, about 5% to 50% copper, over 4% to 20% sulfur, over 0.5% to about 20% iron, the sum of the nickel, copper and sulfur contents being at least about 80% of the matte composition with the balance gangue or slag and incidental impurities, the amount of the sulfur in the matte being less than that required stoichiometrically to combine with the metal values therein and not exceeding substantially the amount required to combine with nickel as $Ni_3S_2$. Because of the iron content, special steps are taken in preparing the feed whereby the matte is granulated by quenching it from the molten state from a temperature of at least about 10°C above its solidus-liquidus temperature but below the matte boiling point. The matte is then finely comminuted, for example, comminuted to a size corresponding to at least about 50% by weight through a 270 mesh screen (U.S. Standard). However, we are not limited to such a size so long as the matte is finely ground to assure the desired dissolution during leaching without undue foaming. Matte ground to provide 50% through 200 mesh may be used. In one embodiment, the leaching method comprises forming an aqueous pulp of said comminuted matte, for example, a pulp having a solids density ranging from about 5% to 65%, ically 15%, said pulp having added thereto a spent
oper electrolyte solution containing sulfuric acid
ficient to provide a pH not exceeding about 2. A
:ferred pulp range is 10% to 40%.

3roadly speaking, the pulp is leached until the pH
:eeds 5 to assure rejection of copper and iron from
: solution. In a preferred embodiment, the pulp is
)jected to a first stage atmospheric leaching step to
ch selectively soluble nickel therefrom until a pH
; been reached falling within the range of about 3.5
4.5 while aerating said pulp. The temperature is
ow boiling and may range from about 60°C to 95°C.
another embodiment to be described later, the matte
y first be selectively preleached without aeration to
nove substantial amounts of iron therefrom before
ijecting the matte to atmospheric leaching.

\s stated hereinabove, the leaching solution during
start of atmospheric leaching should not exceed a
of about 2. Generally speaking, the pH of the solu-
n is less than 1. However, one need not start with a
/ pH. For example, it is possible to use waste copper-
n sulfate solutions having a pH above 2, e.g. 3.5 to
, in which the iron is in the ferrous state and which
·ing aeration generates free sulfuric acid by virtue of
oxidation of ferrous ion to ferric ion during which
lrolysis to the insoluble ferric hydroxide occurs.
us, the pH of such solutions can fall below a pH of 2
in after aeration is started to provide free acid for
ching. Moreover, spent electrolytes emanating from
copper electrowinning circuit may contain high
d (low pH) and the pH may be raised by dilution,
. blending of the aforementioned waste solutions
rewith before recycling the spent electrolyte to at-
spheric leaching. Thus, one advantage of the inven-
n resides in the fact that waste nickel-copper-iron
fate solutions can be beneficially consumed by the
icess.

'ollowing the first stage atmospheric leaching step of
preferred embodiment, the pulp may be subjected
a second stage atmospheric leaching step by replac-
said aeration with a stronger oxidant than air, such
oxygen (or $MnO_4^{-1}$, $S_2O_8^{-2}$, etc.), thereby further
npleting said atmospheric leaching of the sulfide
tte as evidenced by a rise in pH of over about 5. This
;enerally accompanied by a decrease in copper and
n in the solution each to less than about 20 ppm and
ially less than 10 ppm. The resulting solution is sepa-
:d from said solids (residue) for nickel recovery.
: solids may then be subjected, if desired, to high
ssure leaching with a sulfuric acid solution using air
in oxidant, the pH of said acid being less than about
;aid leaching being carried out at a temperature of
)ut 175°C to 205°C at superatmospheric pressure of
)ut 200 psig to 700 psig, thereby forming a leached
idue and a pregnant solution containing substantial
ounts of copper and nickel, the pregnant solution
ng separated from said residue for removal of a
stantial portion of copper therefrom by electrowin-
g, a spent electrolyte being produced which is recy-
1 to the first atmospheric leaching step.

\s has been indicated hereinbefore, the more con-
tional method of atmospheric leaching calls for a
tte feed with very low iron to assure rapid comple-
1 of the reaction. In carrying out the atmospheric
:hing method of the invention, we consider the reac-
1 to be completed for our purposes when the pH of
solution reaches a level high enough to reject the
iper and iron in solution. We have found from out tests that the final pH during atmospheric leaching
should reach a level in excess of 5. For example, tests
have shown that less than 10 ppm copper is attained
when the solution pH reaches 5.3 and less than 10 ppm
iron attained when the pH reaches 5.5. This can be
achieved fairly rapidly by employing the two-stage
atmospheric leaching process. By "fairly rapidly", we
mean the time it takes for the pH during atmospheric
leaching to reach at least 5 or better, e.g. about 5.3 to
about 5.5.

In order to reach a pH of 5 or better, we have found
that when the pH of the solution during aeration
reaches and holds substantially constant (or stalls) at
about 4 because of the presence of iron, we can in-
crease the reaction merely by adding an oxidant stron-
ger than air when pH 4 is reached, such as oxygen,
$MnO_4^{-1}$ (e.g. $KMnO_4$) or $S_2O_8^{-2}$ (e.g. $Na_2S_2O_8$).

It may be preferred when the matte contains substan-
tial amounts of iron within the range stated herein to
subject the comminuted matte to a preleach with dilute
sulfuric acid. It is essential that the matte contain sub-
stantial amounts of nickel, such as 20% nickel or more,
to provide enough nickel sulfide for acid neutralization
during subsequent atmospheric leaching.

The composition of the matte should be such that is
can be comminuted easily. Thus, the sulfur content
should be over 4% and may range upwards to 20%, e.g.
10% to 20%.

It is important that the matte be granulated from a
molten temperature of at least about 10°C, preferably
at least about 25°C, above the solidus-liquidus temper-
ature and below the boiling point.

It is believed that granulating relatively high iron
matte below the solidus-liquidus temperature results in
a $(Ni,Fe)_3S_4$ phase which appears to be less effective
than $Ni_3S_2$ in consuming acid. Granulating the matte
above the solidus-liquidus temperature apparently seg-
regates most of the iron as the relatively inert copper
ferrite which is less detrimental to the reaction kinetics.
However, we do not wish to be held to the foregoing
theory.

For examle, a matte containing 1.25% Fe, 34.8% Ni,
41.6% Cu and 16.8% S was granulated at 930°C (just
below the solidus-liquidus temperature); the time to
complete atmospheric leaching with sulfuric acid (that
is, to read a pH of 5.5) was 440 minutes. On the other
hand, the time to leach the same matte granulated at
1060°C (above the solidus-liquidus temperature) re-
quired only 230 minutes to reach a pH of 5.5. By carry-
ing the reaction out to a pH of 5 or above, hydrolysis of
copper and iron is assured and a final nickel solution
low in these elements is attained.

For mattes high in iron, e.g. 4%, the present solids
during atmospheric leaching should not be so high as to
throw excess ferrous ions into solution because of the
stalling effect of ferrous ions on atmospheric leaching.
We have found that a pulp containing 10% to 25%
solids to be adequate.

DETAILS OF THE INVENTION

The effect of iron content of the matte on atmo-
spheric leaching was determined by preparing a series
of matte compositions by adding varying amounts of
iron to a matte obtained from Bamangwato Concession
Ltd (BCL). A typical BCL matte is a low-iron matte
containing 0.2% Fe, 16.4% S, 40% Ni and 39.5% Cu
with the balance less than 0.5% each of impurities.
Generally, a BCL-type matte assays 16 to 20% S, at least 20% Cu, at least 20% Ni, the sum of the nickel, copper and sulfur contents being over 80% and usually at least about 90%, impurities being less than 0.5% each.

The mattes produced with the varying iron contents are as follows:

Table 1

| Matte No. | ANALYSIS PERCENT | | | |
|---|---|---|---|---|
| | Fe | S | Ni | Cu |
| A | 0.28 | 18.4 | 38.8 | 37.0 |
| B | 1.08 | 19.2 | 38.0 | 37.6 |
| C | 2.04 | 17.2 | 38.0 | 38.0 |
| D | 4.40 | 17.2 | 34.4 | 40.8 |

Each matte was melted and raised to 2500°F in temperature and was protected from oxidation by the addition of carbon. Each of the melts was granulated by quenching in a water spray from a temperature just below the solidus-liquidus temperature of the composition, the temperature being 930°C. The granulated matte was then ground to 75% minus 270 mesh and 50% minus 400 mesh (U.S. Standard).

For each leaching test, a solution comprising 450 ml of lixiviant containing about 31 gpl (grams per liter) Ni, 22 gpl Cu and 46 gpl $H_2SO_4$ was heated to 75°C and air sparged at 580 ml/min with agitation at 420 rpm. This solution is representative of a spent electrolyte solution and has a pH of about 1 by virtue of the free acid present.

In starting the leach, about 117.6 grams of matte are added to the 450 ml of solution (20.7% solids). Six to 10 samples (2 ml each) were taken during the leach period. A test was considered complete when copper and iron were substantially rejected, which occurred by pH 5.5. The adverse effect of iron on leaching time when the matte is granulated from a temperature below the solidus-liquidus temperature will be apparent from Table II as follows:

TABLE II

| % Fe In Matte | Hours to Reject Copper and Iron Each to < 10 ppm |
|---|---|
| 0.28 | 3.0 |
| 1.08 | 3.8 |
| 2.04 | 5.0 |
| 4.40 | 9.8 |

As will be noted, the higher the iron in the matte, the longer is the leaching time to reject copper and iron for mattes quenched below the solidus-liquidus temperature. The effect of ferrous ion in the leaching solution was also determined at concentrations of 0 to 8 grams per liter of iron for matte containing 0.3% iron. Thus, at zero iron concentration, the leaching time was 3 hours (pH-5.3); at 4 grams per liter, it was 3.8 (pH-5.3) and at 8 grams per liter, it was 4 hours (pH-5.3). The same low-iron matte quenched from above the solidus-liquidus temperature took over 5.8 hours to reach a pH of 5.3. Thus, it will be noted that iron in the matte and iron in the solution adversely affect leaching time.

When a pH of 5.3 is reached in the leaching solution, substantially all of the copper in solution is rejected. However, it was observed that when an oxidant stronger than air is used, iron is more efficiently rejected from solution. Tests have shown that by using air in the intial stages until a pH of 4 is reached and then replacing it by a stronger oxidant, such as $O_2$ or $KMnO_4$, substantially all of the iron is rejected and at a much faster rate (note FIG. 4).

Results obtained on various iron-containing mattes using the nickel-copper-sulfuric acid solution referred to hereinbefore are summarized in Table III below.

TABLE III

| Fe in Matte | Type of Oxidant | Final Fe in Solution ppm | Final Cu Conc. ppm |
|---|---|---|---|
| 0.28 | Air | 40 | 10 |
| 1.1 | Air | 1300 | 10 |
| 2.0 | Air | 1200 | 10 |
| 4.4 | Air | 300 | 10 |
| 4.4 | $O_2$* | 10 | 10 |
| 4.4 | $KMnO_4$** | 10 | 10 |

*Air used to pH 4 and then replaced by $O_2$.
**Air used for the entire test and $KMnO_4$ then added at pH 4.

As will be noted, when an oxidant stronger than air is added to the solution after it reaches a pH of 4, the iron is substantially and more efficiently rejected with the copper at less than 20 parts per million, for example, to 10 ppm.

Figure 2:
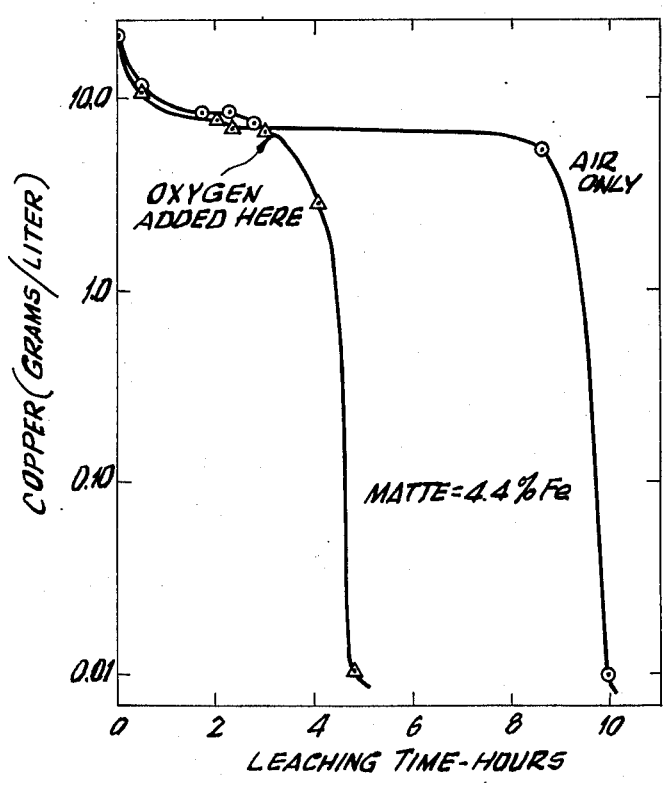

FIGS. 1 and 2 show different aspects of the same experiments. The variation of copper and iron concentration with time is shown by the curves of each figure which include tests with and without oxygen addition at pH 4. In all cases, most of aqueous iron was in the ferrous oxidation state. As will be noted from FIG. 1 (iron) and FIG. 2 (copper), the addition of oxygen at pH 4 decreased the leaching time in half (about 4 to 4.5 hours) as evidenced by the fact that the pH of 5.5 was reached in half the time and the copper and iron in solution rejected to a level of 0.01 gram/liter (10 ppm), whereas, with air alone, the reaction continued for over 9 hours to reach the desired pH.

Figure 3:
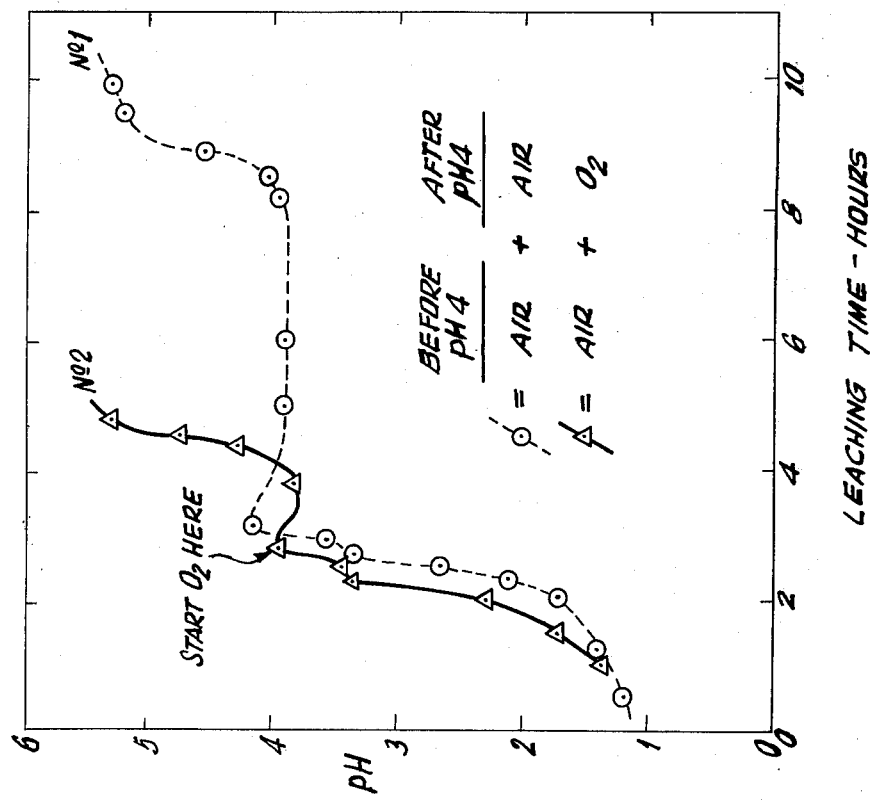
FIG. 3 shows curves depicting pH as a function of atmospheric leaching time for a nickel-copper sulfide matte containing 4.4% iron.

In this connection, reference is also made to FIG. 3 which shows the changes in pH during the atmospheric leach when the matte contains 4.4% iron and when the matte is quenched from above the solidus-liquidus temperature, that is, at 1060°C. However, it will be noted that when only air is used as the oxidant, the total leaching time is about 10 hours, half of which is consumed at pH 4. That is to say, the leaching stalls or stagnates at pH 4 for high iron mattes during first stage leaching. On the other hand, when oxygen is added to the leach solution at pH 4 at the second stage, it will be observed from FIG. 3 that the reaction goes forth quite rapidly as evidenced by the fact that the pH shoots up to about 5.5, the reaction completing fairly rapidly in about half the time or 5 hours.

The strong oxidant may be added to the leaching solution at any time when the solution reaches a pH of about 3.5 to 4.5 in the first stage leaching. The amount of oxidant added may be determined on the stoichiometric basis, based generally on the amount of iron in the matte and/or ferrous ion in the solution. Generally, a stoichiometric excess must be added. For example, in oxidizing ferrous ion to ferric ion using $KMnO_4$, the leaching time was reduced from 9.8 hours (air alone) to 4.8 hours when the $KMnO_4$ was added in the second stage to the leach solution after it reached a pH of 4.

We have found that it may be desirable to first preleach high iron matte to remove a substantial portion of the iron therein before subjecting it to atmospheric leaching to dissolve selectively the nickel.

One test comprises preleaching 4.4% iron matte at 90°C (50% solids) with a dilute sulfuric acid having a pH of 2.5, without aeration, the time employed being two hours. The results obtained are as follows:

TABLE IV

| Time Hours | Metal Extraction - % | | |
|---|---|---|---|
| | Ni | Cu | Fe |
| 0.5 | 1.7 | Nil | 31 |
| 1.0 | 2.3 | Nil | 36 |
| 2.0 | 3.7 | Nil | 40 |
| 4.0 | 4.4 | Nil | 42 |

Some $H_2S$ evolved during leaching and especially during filtration. The results of the atmospheric leaching with and without preleach are compared in FIG. 4.

Figure 4:
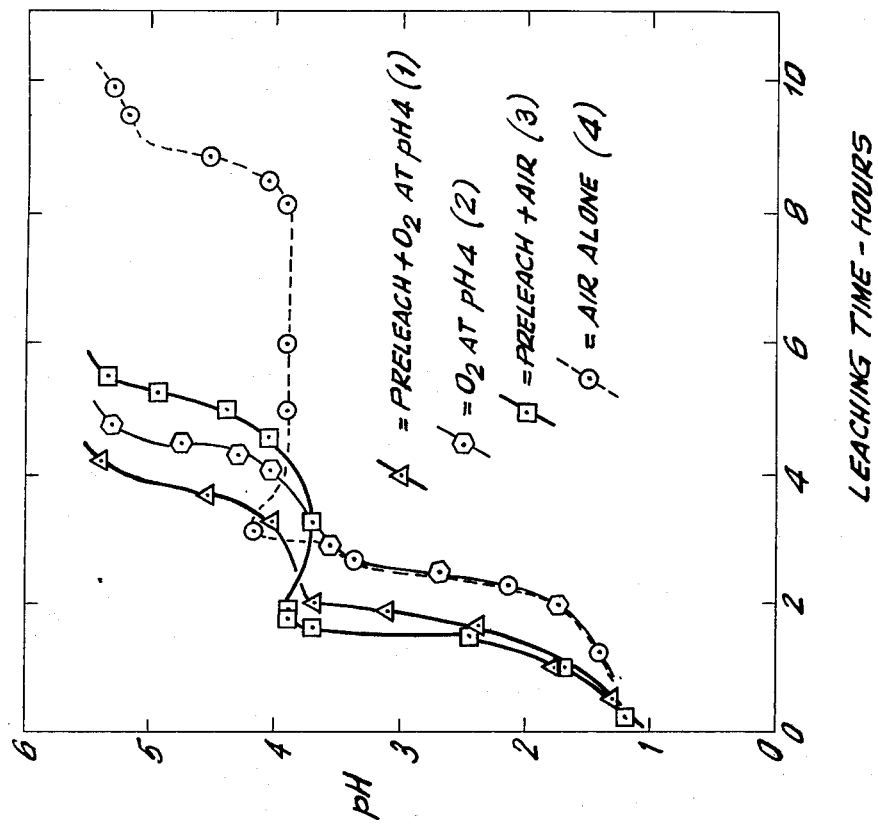
FIG. 4 depicts a group of curves each showing pH as a function of leaching time, as affected by iron pre-leach, oxygen input and air alone.

In the case of test (1) shown in FIG. 4, the matte was first preleached as described above for about 2 to 4 hours and the preleached matte subjected to atmospheric leaching using the solution described earlier (i.e. 31 gpl Ni, 22 gpl Cu and 46 gpl $H_2SO_4$) using air as the oxidant until pH 4 was reached. The air was replaced by oxygen and the leaching continued to a pH over 5. As will be noted, this test gave the best result, the reaction being completed in about 4 hours (pH- 5.5).

In Test (2) without the preleach, air was replaced with oxygen when the solution reached pH 4. While good results were obtained, this test took a little longer than test (1).

As for Test (3), preleach plus air was employed in which the leaching was completed in slightly less than 6 hours, whereas, in Test (4), air alone took 9 to 10 hours to reach a pH of over 5. As will be observed, preleach plus air is a marked improvement over air alone.

Thus, in its broad aspects, the invention resides in first quenching high iron matte from above the solidus-liquidus temperature, followed by atmospheric leaching the matte until a pH of over 5 is obtained using air as an oxidant. Preferably, where time is important, it is preferred to leach to a pH of approximately 4 in a first stage atmospheric leach and then replace the air with a stronger oxidant in the second stage to complete the reaction to a pH over 5 to reject substantially both the copper and the iron.

In its preferred aspects, the ground matte may be first preleached in dilute sulfuic acid at a pH ranging from about 1 to 3 and a pulp density ranging from about 20% to 60% solids and then subjected to atmospheric leaching to dissolve selectively the nickel and reject the copper and iron from solution while consuming substantial amounts of free acid present. As stated hereinbefore in a preferred embodiment, two atmospheric leaching steps may be employed, a first stage in which air is used to a pH of about 4 and a second stage in which a stronger oxidant is added to replace air at said pH, the oxidant being any well known oxidant for oxidizing ions in solutions to the higher valency state, such oxidants including $O_2$, $MnO_4^{-1}$, $S_2O_8^{-2}$, and the like.

The relationship between leaching rate and iron content of the matte is clearly demonstrated in Table II. The presence of over 4% iron in the matte more than triples the time required to reach pH 5.5 during atmospheric leaching. Where a low iron matte (<0.5%) is leached using a solution containing 8 gpl of ferrous ion, the presence of the foregoing iron in the solution increases the leaching time by about one-third where the matte leached has been granulated by quenching it at below the solidus-liquidus temperature.

As stated hereinbefore, it is believed that when high iron matte is granulated by quenching from below the solidus-liquidus temperature, the iron enters the $Ni_3S_2$ lattice and lowers the ability of the $Ni_3S_2$ compound to consume acid generated by iron hydrolysis. The probable sequence of reactions is as follows:

$$Fe^{++} + \tfrac{1}{4} O_2 + H^+ \rightarrow Fe^{+++} + \tfrac{1}{2} H_2O \qquad (1)$$

$$Fe^{+++} + 3H_2O \rightarrow Fe(OH)_3 + 3H^+ \qquad (2)$$

$$Ni_3S_2 + 2H^+ + 1/2O \rightarrow Ni^{++} + 2NiS + H_2O \qquad (3)$$

The addition of oxygen (note FIG. 3) activates the iron-contaminted matte by forcing reaction (3) to the right. Thus, the excess acid generated by reaction (2) is consumed thereby allowing the solution pH to rise to above 5, e.g. 5.5.

Long atmospheric leach retention time caused by iron in the matte may have advantages. For example, reaction (1) and (2) above have more time to progress, thus generating a final liquor containing less iron (see Table III). Generally, this results in more solubilization of nickel.

It should be noted that most of the iron dissoved by preleaching is solubilized during the first hour or two of leaching. The data of Table IV indicate that little benefit is achieved from preleaching for more than 2 hours. As stated hereinbefore, preleaching alone (FIG. 4) can be effective in reducing atmospheric leaching time. However, as stated herein, it is possible to obtain desirable results without using an iron preleaching step so long as other precautions are taken, such as using a strong oxidant after a pH of 4 has been reached during the first stage of atmospheric leaching.

Figure 5:
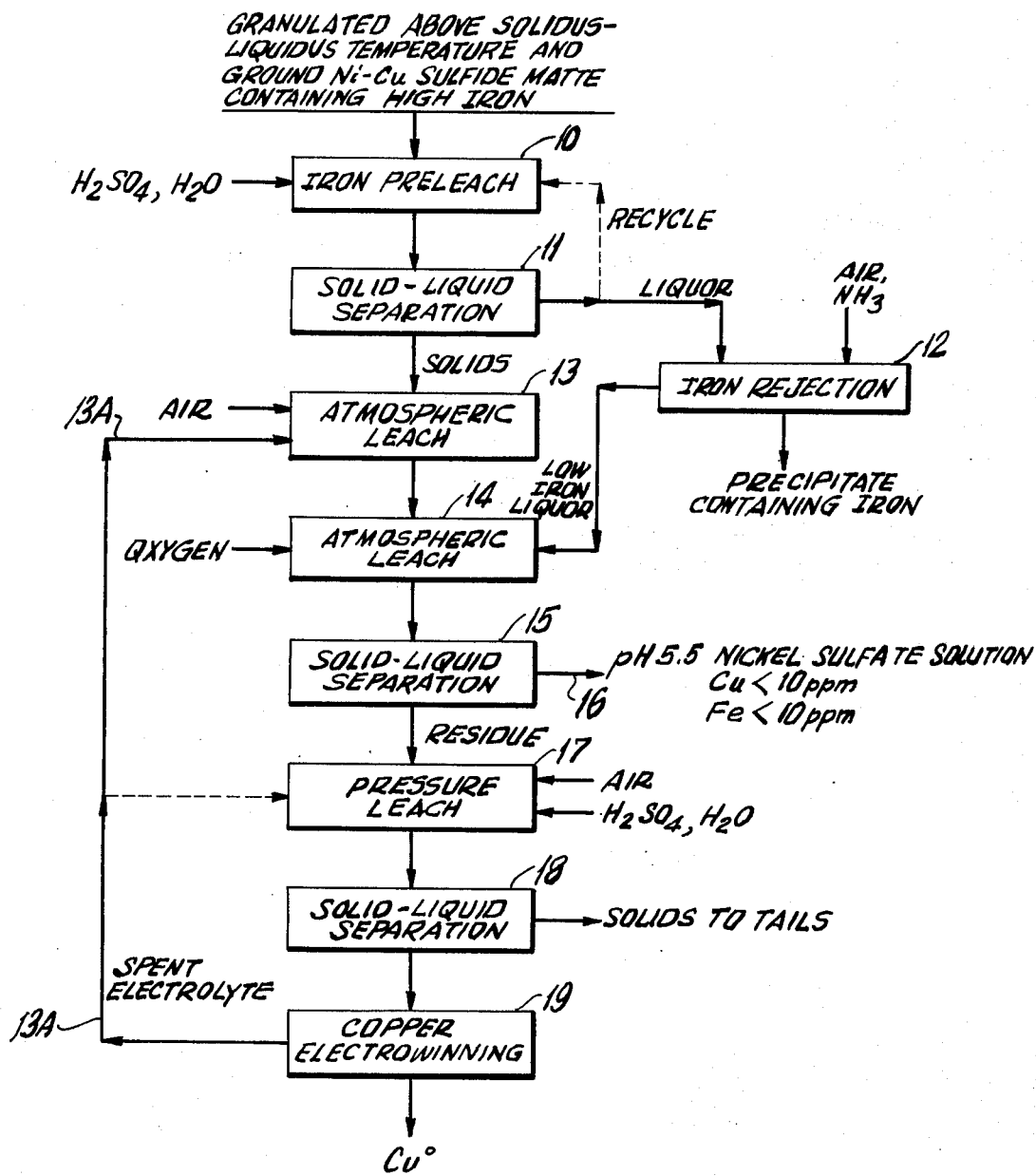
FIG. 5 is illustrative of a preferred flow sheet for carrying out one embodiment of the invention.

As illustrative of a preferred embodiment of the invention using an iron preleach step, the following example is given with reference to the flow sheet of FIG. 5.

EXAMPLE

A nickeliferous sulfide matte was provided containing 34.4% Ni, 40.8% Cu, 17.2% S 4.4% Fe and the balance gangue or slag and trace impurities.

The matte was melted, raised to a temperature of about 2500°F (1372°C) protected from oxidation by carbon addition and then granulated in a water spray from a temperature above the solidus-liquidus temperature of about 1940°F (1060°C), the solidus-liquidus temperature being approximately 980°C.

Referring to FIG. 5, following granulation of the matte, it was wet ball milled to a size of 50% minus 400 mesh. However, we are not limited to this size. A pulp of about 50% solids was produced with dilute sulfuric acid, with the pH at about 2.5 and the pulp preleached at 10 (FIG. 5) for about 2 hours at 90°C. Following preleach, the leached pulp is passed to the solid-liquid separation step 11 where the preleach liquor is separated and passed to the iron rejection step 12 where the iron is precipitated using air and $NH_3$, the solids now going to the first stage atmospheric leaching step 13, where the solids is mixed with recycle spent electrolyte 13A as shown to form a pulp of about 15% solids, the recycle spent electrolyte containing 22 gpl Cu, 32 gpl Ni and 45 gpl $H_2SO_4$, the pH being about 1 and the temperature about 75°C.

The solution is aerated during leaching until a pH of over 5 is obtained. Preferably, two-stage leaching is employed in which the leaching is carried out during a first stage until a pH of about 4 is reached. The air is then replaced with oxygen the the pulp subjected to second stage leaching as shown in the flow sheet at 14. Low iron liquor from iron rejection step 12 may be added to the second stage atmospheric leaching step. When the pH reaches over 5, e.g. from about 5.3 to 5.5, the leach residue remaining is separated at 15 from the atmospheric leach liquor, the liquor with a pH of approximately 5.5 and less than about 20 ppm each of copper and iron being then passed to nickel recovery at 16.

The residue remaining from the first and second stage atmospheric leach steps may then be sent to pressure leach 17 in an autoclave, a pulp being formed at about 20% solids acid and water being added to provide about 0.25 lb. of sulfuric acid for each pound of residue with the pH less than 2. The pulp is subjected to an oxidation leach step at an elevated temperature and pressure of about 175°C to 205°C (345°F to 400°F) at 200 psig to 900 psig, the time of leaching being about 30 minutes. The pregnant solution contains about 20 to 40 gpl Ni, about 40 to 60 gpl Cu and about 10 to 50 gpl $H_2SO_4$. The pregnant liquor is separated from the leach residue at 18, the solids being sent to tails, and the pregnant liquor being preferably sent to copper electrowinning (19) where a substantial portion of the copper is recovered as high grade electro-copper, the spent electrolyte containing about 32 gpl Ni, 22 gpl and Cu and 45 gpl sulfuric acid, the electrolyte being diluted with process make-up water when necessary. The spent liquor is then recycled to the first stage atospheric leach as make-up acid as discussed hereinabove.

Copper electrowinning is well known and need not be gone into detail here.

Broadly speaking, the pregnant liquor before electrowinning and after acidifying and dilution will generally contain about 20 to 40 gpl Ni, about 40 to 60 gpl Cu and about 10 to 50 gpl $H_2SO_4$.

The spent electrolyte used as make-up acid may contain up to 80 gpl Ni, about 0.1 to 80 gpl Cu and 1 to 100 gpl $H_2SO_4$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of leaching comminuted nickeliferous sulfide matte containing about 20% to 75% nickel, about 5% to 50% copper, non-stoichiometric sulfur in the range of over 4% to 20% and over 0.5% to about 20% iron, the sum of the nickel, copper and sulfur contents being at least about 80% which comprises, providing said matte as a granulated product formed by quenching molten matte from a temperature at least about 10°C above its liquidus-solidus temperature, comminuting said granulated matte, subjecting said matte to a first stage atmospheric leaching step to dissolve nickel selectively therefrom by using a spent copper electrolyte solution containing sufficient sulfuric acid having a pH ranging up to about 2 while aerating said solution until the pH of said solution during leaching reaches a level of about 3.5 to 4.5, then further subjecting said matte to a second stage atmospheric leaching step in said spent copper electrolyte by replacing said aeration with a stronger oxidant selected from the group consisting of oxygen, $MnO_4^{-1}$ and $S_2O_8^{-2}$ to further complete said atmospheric leaching as evidenced by a rise in pH of over about 5, thereby forming a pregnant solution containing nickel and a nickel-copper containing residue, separating the pregnant solution from said residue for nickel recovery, and subjecting said nickel-copper containing residue to a sulfuric acid leaching step at elevated temperature and pressure to recover metal values therefrom.

2. The method of claim 1, wherein following comminution of said matte, the matte is first subjected to a sulfuric acid preleach at a pH of about 1 to 3 to remove substantial amounts of iron therefrom, following which the preleached matte is subjected to said first and second stage atmospheric leaching.

3. The method of claim 1, wherein said first stage atmospheric leaching is carried out to a pH level of approximately 4.

4. The method of claim 1, wherein said second stage leaching is carried out in said spent copper electrolyte to a pH level of at least about 5.3 and wherein copper and iron in said solution are each decreased to below about 20 ppm.

5. The method of claim 1, wherein the amount of the sulfur in the matte is less than that required stoichiometrically to combine with the metal values therein and does not exceed substantially the amount required to combine with nickel as $Ni_3S_2$, wherein following granulation the matte is comminuted to a size of at least about 50% through 200 mesh and wherein said atmospheric leaching is carried out at a temperature of about 60°C to 95°C.

6. The method of claim 5, wherein following comminution of said matte, the matte is first subjected to a sulfuric acid preleach at a pH of about 1 to 3 to remove substantial amounts of iron therefrom, following which the preleached matte is subjected to said first and second stage atmospheric leaching.

7. The method of claim 5, wherein said first stage atmospheric leaching is carried out to a pH level of approximately. 4.

8. The method of claim 5, wherein said second stage atmospheric leaching is carried out to a pH level of at least about 5.3 and wherein copper and iron in said solution are each decreased to below about 20 ppm.

9. The method of claim 5, wherein the solids following the first and second stage atmospheric leaching steps is high pressure leached using an acid solution of pH below about 2 at a temperature of about 175°C to 250°C and a superatmospheric pressure of about 200 psig to 900 psig to form a pregnant solution containing copper and nickel and an insoluble residue.

10. The method of claim 9, wherein said pregnant solution is separated from said residue and substantial amounts of copper removed from said solution by electrowinning, thereby forming a spent electrolyte, following which said spent electrolyte is recycled to the first stage atmospheric step.

* * * * *